United States Patent [19]

Ainscow

[11] 4,348,688

[45] Sep. 7, 1982

[54] MULTIBEAM CATHODE RAY TUBE APPARATUS

[75] Inventor: Frank Ainscow, Hampshire, England

[73] Assignee: International Business Machines Corporation, Armonk, N.Y.

[21] Appl. No.: 175,996

[22] Filed: Aug. 7, 1980

[30] Foreign Application Priority Data

Aug. 31, 1979 [GB] United Kingdom ................ 7930261

[51] Int. Cl.³ ............................................. H04N 9/535
[52] U.S. Cl. ................................. 358/29; 315/13 CG
[58] Field of Search ...................... 358/29, 21, 168, 65, 358/64, 242; 315/13 R, 13 CG, 14, 31 TV

[56] References Cited

U.S. PATENT DOCUMENTS 3,812,397 5/1974 Marsh, Jr. ............................. 358/29
4,112,460 9/1978 Arneson ................................ 358/29

FOREIGN PATENT DOCUMENTS 1195757 6/1970 United Kingdom .................. 358/29

Primary Examiner—Richard Murray
Attorney, Agent, or Firm—Frederick D. Poag

[57] ABSTRACT

Multibeam cathode ray tube apparatus incorporates control circuits for maintaining the relative intensity of the beams over a range of settings of the brightness control. As applied to a three beam color tube, at least two, and preferably all three, of the electron guns have each a control circuit located between the control grid ($V_{g1}$) and a variable voltage source (V) which constitutes the brightness control of the display. A potentiometer ($R_1$) allows the voltage (V) to be variably attenuated and a second potentiometer ($R_2$) acting in conjunction with a current source (I) allows the attenuated voltage to have a variable voltage added thereto. The potentiometers ($R_1$ and $R_2$) for each electron gun are adjusted to bring the brightness versus control voltage characteristic for each gun into coincidence. The current source (I) may be constituted by a fixed resistor and a fixed voltage. The invention is also applicable to multibeam monochrome tubes.

13 Claims, 3 Drawing Figures

MULTIBEAM CATHODE RAY TUBE APPARATUS

FIELD OF THE INVENTION

The present invention relates to multibeam cathode ray tube apparatus. The preferred application of the invention is to color balance control in a multibeam color cathode ray tube, but it can also be used in a multibeam monochrome cathode ray tube. The background to the invention will be outlined in terms of color tubes and the application to monochrome tubes will be clear from the preferred embodiment.

BACKGROUND OF THE INVENTION

In a color cathode ray tube, in order to achieve a balance in the apparent brightness of different colors and correct rendering of secondary colors, it is necessary to compensate for variations in phosphor efficiency and transconductance between the three guns. The book entitled "Colour Television Theory" by G. H. Hutson (McGraw-Hill, London, 1971) describes, at pages 82 to 85, the adjustment of a color television to maintain a color balance for different contrast levels of a gray scale image. Firstly the lowlights are adjusted by bringing the cut-off points for all three guns into registry. This is done by adjusting the screen (the first anode) voltages of the three guns. Next, the highlights are adjusted to compensate for the slightly different gun slopes and the different phosphor efficiencies. This is done by varying the luminance signal drive to the cathodes of the three guns.

British Pat. No. 1,456,439 describes a color television receiver incorporating an in-line cathode ray tube rather than the older delta type. It is pointed out that in the kind of in-line tube to which the specification relates, there is a common first control grid and a common screen grid so that there is no provision for separate adjustment of the red, green and blue screen potentials to bring their cut-off points into registry. The specification describes in detail a control circuit for applying individually adjustable D.C. bias to the respective cathodes.

Neither the aforementioned book nor the aforementioned specification describe how the color balance is maintained for different settings of the brightness control of the receiver, it being assumed that once the balance has been set for different contrast levels at one setting of the brightness control, it will remain in balance for other settings.

SUMMARY OF THE INVENTION

An object of the present invention is to provide multibeam apparatus which incorporates a balance control allowing the relative intensities of the beams to be set for a range of settings of the brightness control.

According to the present invention, multibeam cathode ray tube apparatus comprises a color cathode ray tube including means to generate a plurality of electron beams, a control grid for each beam, and a brightness control incorporating a source of variable voltage for varying the brightness of the display, and is characterized in that between said source of variable voltage and all save at most one of said control grids there are provided means for applying a linear transformation to said variable voltage so that the transformed brightness versus voltage characteristic substantially coincides with a predetermined characteristic.

BRIEF DESCRIPTION OF THE DRAWINGS

The invention will now be particularly described, by way of example, with reference to the accompanying drawings, in which.

DETAILED DESCRIPTION

Figure 1:
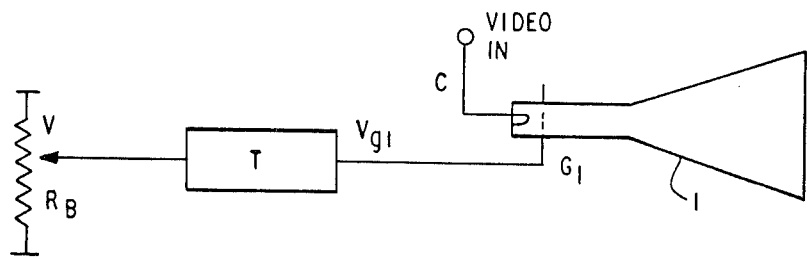
FIG. 1 serves to illustrate the theory behind the present invention.

Referring now to FIG. 1, a digital color display includes a color cathode ray tube 1 including three electron guns, only part of one being shown. Each electron gun includes a cathode C to which the video signal is applied. The function of the video signal is to turn the electron beam on and off as it moves across the face of the CRT 1 so as to produce a required display. Each electron gun also includes a control grid $G_1$ by means of which the intensity of the beam, and hence the brightness, can be adjusted. To this end, a variable resistor $R_B$ supplying a variable voltage V is provided. In accordance with the invention, before the voltage V is applied to the Grid $G_1$, a circuit T applies a linear transformation thereto so that the transformed brightness versus voltage characteristic substantially coincides with a predetermined characteristic. In theory, only two of the control grids $G_1$ will need to have a transformed voltage $V_{g1}$ applied thereto for a correct color balance but in practice it is beneficial to apply a transformation for each gun since this will allow the useful range of the brightness control $R_B$ to be set with precision.

The emission of electrons by an electron gun is described by Child's Law:

$$J = k(V_{g1} + V_{g2}/\mu)^{3/2}/d^2 \qquad (i)$$

where the cathode voltage is defined to be zero,
J is the current density,
d is grid 1 to cathode spacing,
$\mu$ is the mutual conductance,
k is a constant, and
$V_{g1}$ and $V_{g2}$ are the potentials of grid 1 and grid 2 (the first anode) respectively, $V_{g2}$ being fixed and $V_{g1}$ being derived from the brightness control.

Provided the phosphors are not driven outside their linear range, the brightness is proportional to J, although the proportionality constant is different for each phosphor. Consequently, for the brightness B, using equation (i)

$$B = P(Q - V_{g1})^{3/2}, (B \geq 0) \qquad (ii)$$

where P and Q are constants for each gun.

In order to achieve color balance at all levels, it is necessary to make the B versus V characteristics of the three colors coincide, regardless of the values of the constants P and Q. This is done by applying the linear transformation T to the voltage V produced by the brightness control $R_B$.

Let the transformation T be such that $$V_{g1} = XV + Y$$

and let the desired B versus V characteristic be $$B = R(S + V)^{3/2} \quad \text{(iii)}$$

If P and Q take the values P' and Q'

$$\text{then } B' = P'(Q' - (XV + Y))^{3/2}$$
$$= P'X^{3/2}((Q' + Y)/X - V)^{3/2}$$

Comparing this with equation (ii) then B'=B if $X = (R/P')^{\frac{2}{3}}$ and $Y = SX - Q'$. This demonstrates that for any value of the constants P and Q, a transformation T(X,Y) can be chosen to bring the B versus V characteristic into coincidence with a chosen, ideal characteristic.

Figure 2:
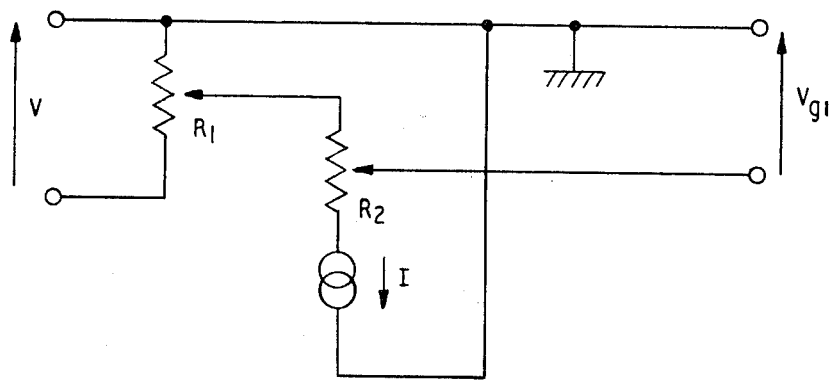
FIG. 2 shows a circuit incorporating the principles illustrated in FIG. 1.

This principle is implemented in the circuit shown in FIG. 2 which shows the transformation circuit for only one of the guns. The circuit comprises a potentiometer $R_1$ which gives a variable attenuation of the voltage V allowing X to take values in the range 0 to 1. A potentiometer $R_2$ and a current source I add a variable voltage to XY, allowing Y to take values in the range 0 to $-I.R_2$. Thus, the potentiometer $R_1$ allows the value of X to be set and the potentiometer $R_2$ allows the value of Y to be set to bring the B versus V characteristic into coincidence with the chosen characteristic.

In practice, the current source I may be replaced by a resistor approximately equal to $R_2$ and a negative voltage source of approximately twice the maximum value of V. It is, in principle, necessary to apply the correction to only two of the three guns since their characteristics can then be adjusted to coincide with the third. It is, however, convenient to apply correction to all three guns since this allows the useful range of the brightness control to be set with precision.

Figure 3:
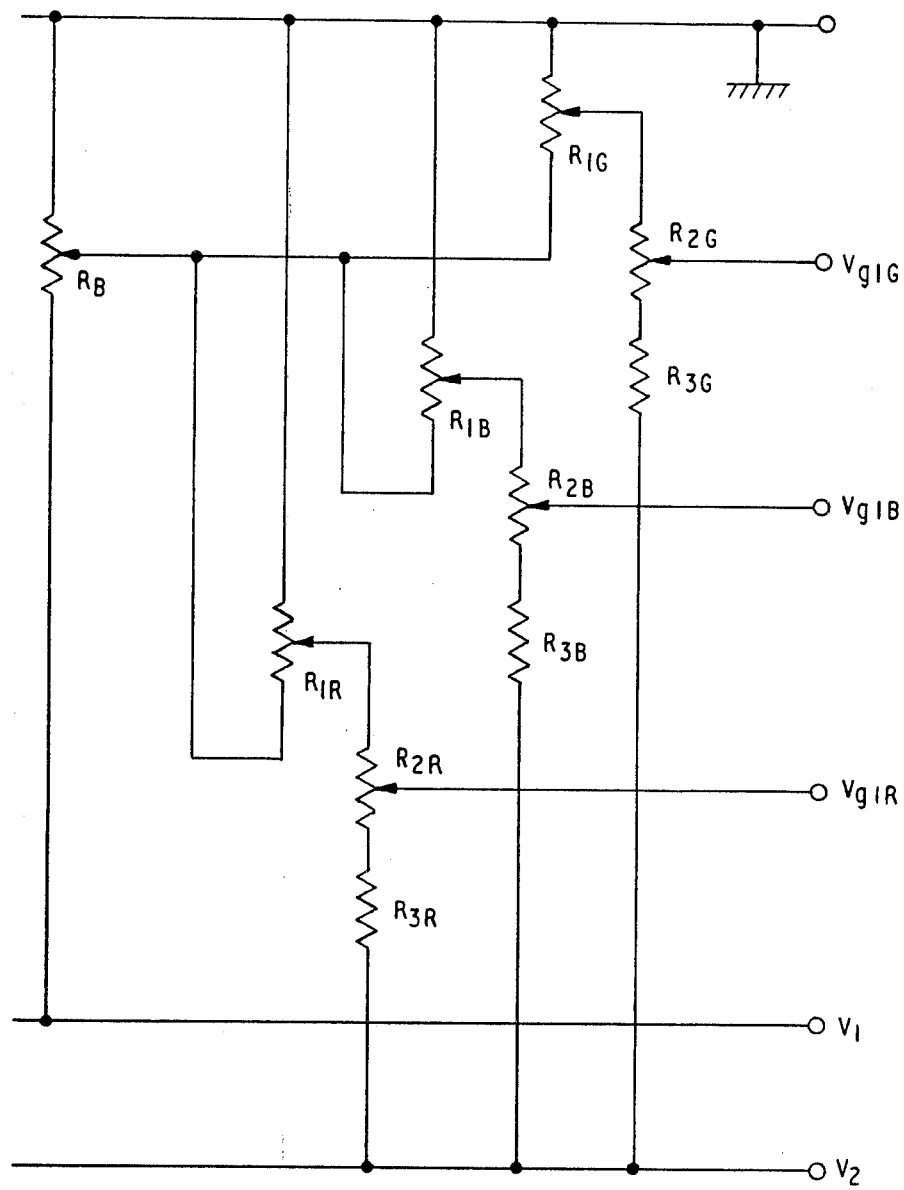
FIG. 3 is a circuit diagram of a practical embodiment of the invention.

FIG. 3 is a circuit diagram showing a practical embodiment of the invention. Potentiometer $R_B$ connected between voltage source $V_1$ and ground constitutes the brightness control of the CRT display and produces a variable voltage V. Potentiometers $R_{1G}$ and $R_{2G}$ allow the values of X and Y to be set to transform the voltage V into the corrected grid voltage $V_{g1G}$ for the green gun. The resistance $R_{3G}$ and the voltage source $V_2$ act as the current source I of FIG. 2. Similar circuits are used for the blue and red guns, the components being shown with the suffixes B and R respectively.

Typical values for the circuit components of FIG. 3 are:

$$V_1 = -75 \text{ volts}, \quad V_2 = -150 \text{ volts}$$
$$R_B = 100\text{k ohms}$$
$$R_{1B} = R_{1G} = R_{1R} = 200\text{k ohms}$$
$$R_{2B} = R_{2G} = R_{2R} = 750\text{k ohms}$$
$$R_{3B} = R_{3G} = R_{3R} = 250\text{k ohms}$$

Instead of having separate resistors $R_{3B}$, $R_{3G}$ and $R_{3R}$, these resistors together with their associated potentiometers $R_{2B}$, $R_{2G}$ and $R_{2R}$ respectively may each be replaced by a single potentiometer of typical value 1 M ohm.

What has been described is a color balance control circuit which allows the correct color balance to be maintained over a range of brightness. In contrast to earlier television receiver circuits which control the slope of the electron guns by variably attenuating the luminance signal before it is applied to each gun, the present invention controls the slope by acting on the grid bias voltage, leaving the video signal unchanged. As a result, the circuit is considerably simpler and cheaper and, moreover, does not limit the bandwidth of the video signal.

It is clear from the above description that the invention is concerned only with brightness. Accordingly, it is applicable to a multibeam monochrome tube as a means for ensuring that a desired relative intensity is achieved by each beam over a range of settings of the brightness control.

While the invention has been particularly shown and described with reference to a preferred embodiment thereof, it will be understood by those skilled in the art that various changes in form and detail may be made therein without departure from the spirit and scope of the invention.

Having thus described my invention what I claim as new and desire to secure by Letters Patent is:

1. Multibeam cathode ray tube apparatus comprising a cathode ray tube including means to generate a plurality of electron beams, a control grid for each beam, and a brightness control incorporating a source of variable voltage for varying the brightness of the display, characterized in that between said variable voltage source and all save at most one of said control grids there is provided means for applying a linear transformation to said variable voltage so that the transformed brightness versus voltage characteristic substantially coincides with a predetermined characteristic.

2. Apparatus as claimed in claim 1, characterized in that means for applying a said linear transformation are provided for each of said electron guns and the slope of the transformation with respect to each gun is adjustable in accordance with the transfer characteristics of the cathode ray tube.

3. Apparatus as claimed in claim 1 or claim 2, characterized in that each transformation means includes a first potentiometer for variably attenuating said variable voltage, and a second potentiometer and a current source for adding a variable voltage to said attenuated voltage.

4. Apparatus as claimed in claim 3, characterized in that each of said current sources includes a fixed resistor and a source of fixed potential.

5. Apparatus as claimed in claim 4, characterized in that each said fixed resistor and its associated second potentiometer are replaced by a single potentiometer.

6. Apparatus as claimed in claim 5, characterized in that the cathode ray tube is a multibeam color tube.

7. Apparatus as claimed in claim 5, characterized in that the cathode ray tube is a multibeam monochrome tube.

8. Apparatus as claimed in claim 4, characterized in that the cathode ray tube is a multibeam color tube.

9. Apparatus as claimed in claim 4, characterized in that the cathode ray tube is a multibeam monochrome tube.

10. Apparatus as claimed in claim 3, characterized in that the cathode ray tube is a multibeam color tube.

11. Apparatus as claimed in claim 3, characterized in that the cathode ray tube is a multibeam monochrome tube.

12. Apparatus as claimed in claim 1 or claim 2, characterized in that the cathode ray tube is a multibeam color tube.

13. Apparatus as claimed in claim 1 or claim 2, characterized in that the cathode ray tube is a multibeam monochrome tube.

* * * * *